United States Patent [19]
Wurst et al.

[11] Patent Number: 5,518,205
[45] Date of Patent: May 21, 1996

[54] HIGH ALTITUDE, LONG DURATION SURVEILLANCE SYSTEM

[75] Inventors: Stephen G. Wurst, Lancaster; Ray H. Bartlett, III, Orange; David S. Wright, Santa Clarita, all of Calif.

[73] Assignee: Rockwell International Corporation, Seal Beach, Calif.

[21] Appl. No.: 300,897

[22] Filed: Sep. 6, 1994

[51] Int. Cl.⁶ .............................. B64B 1/20; B64D 41/00
[52] U.S. Cl. ................... 244/58; 244/5; 244/25; 244/28; 244/96; 244/ 53 R
[58] Field of Search .................. 244/1 TD, 5, 24, 244/25, 28, 29, 30, 55, 56, 58, 96, 98, 99, 173

[56] References Cited

U.S. PATENT DOCUMENTS

| | | |
|---|---|---|
| 3,089,670 | 5/1963 | Johnson . |
| 3,118,437 | 1/1964 | Hunt ............................................ 244/73 |
| 4,261,534 | 4/1981 | Roselli ........................................ 244/96 |
| 4,285,481 | 8/1981 | Biscomb ..................................... 244/33 |
| 4,364,532 | 12/1982 | Stark .......................................... 244/30 |
| 4,403,755 | 9/1983 | Gutsche ................................. 244/53 R |
| 4,534,525 | 8/1985 | Bliamptis .............................. 244/53 R |
| 4,889,297 | 12/1989 | Ikeda ............................................ 244/5 |
| 5,395,070 | 3/1995 | Stirbl et al. ................................ 244/58 |

FOREIGN PATENT DOCUMENTS

| | | | |
|---|---|---|---|
| 501811 | 4/1920 | France ......................................... 244/5 |
| 2808169 | 8/1979 | Germany ................................... 244/58 |
| 1-285487 | 11/1989 | Japan ......................................... 244/25 |
| 5-221387 | 8/1993 | Japan ......................................... 244/58 |
| 8903342 | 4/1989 | WIPO ....................................... 244/58 |

*Primary Examiner*—Andres Kashnikow
*Assistant Examiner*—Virna Lissi Mojica
*Attorney, Agent, or Firm*—Charles T. Silberberg; Lawrence N. Ginsberg; Terrell P. Lewis

[57] ABSTRACT

A novel, high-altitude, solar powered aircraft, capable of staying aloft at high altitudes for many months or even years to conduct around the clock surveillance and/or reconnaisance, includes a forward wing with solar energy capturing cells, a rear wing, inflated pontoons for keeping the aircraft aloft, suspension wires attached to the pontoons, a gondola suspended from and connected to the wires, control apparatus for moving the gondola along the wires, shifting the weight of the aircraft and thereby enabling banking to optimize exposure of the solar cells to the rays of the sun. The gondola preferably contains a sensor suite, power generating and storage apparatus, and synthetic aperture radar imaging apparatus.

11 Claims, 1 Drawing Sheet

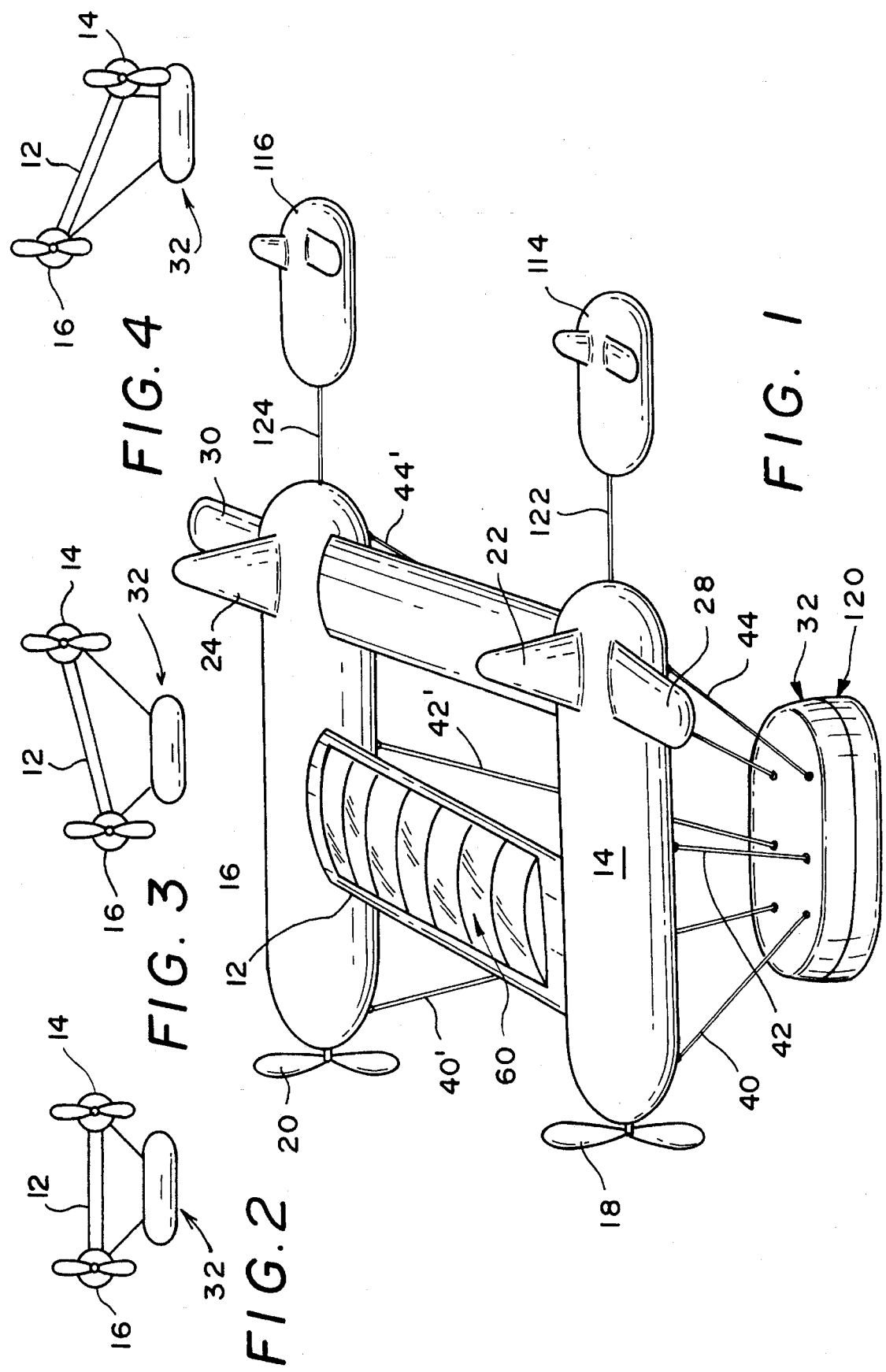

HIGH ALTITUDE, LONG DURATION SURVEILLANCE SYSTEM

BACKGROUND OF THE INVENTION

1. Field of the Invention

The present invention relates to high altitude, solar powered aircraft, and more particularly to a wing design for long-term, high altitude flight of a solar powered aircraft.

2. Description of the Related Art

A solar-powered aircraft is one which derives energy from the sun by means of photovoltaic solar cells. This energy may be transformed for use in an electric motor to power the aircraft. Excess energy is stored either as potential energy in the form of increased altitude of the aircraft, or as energy stored onboard in batteries or in some other energy storage system. The stored energy is used to keep the vehicle aloft during the night so that flight time is not limited by fuel supply as it is on a conventional aircraft.

A vehicle such as this must be able to fly at an altitude high enough to be above the clouds so as to collect the maximum amount of solar radiation possible, and to avoid winds with velocities much higher than the airspeed of the vehicle. Because of its long endurance and limited weight carrying ability, this type of vehicle is normally considered to be a pilotless aircraft.

The prior art discloses solar-powered aircraft of conventional configuration with solar cells on top of the wing or fuselage. U.S. Pat. No. 3,089,670 describes an aircraft where the wing surfaces are provided with solar cells, while U.S. Pat. No. 3,744,865 discloses a rotary type aircraft with solar cells located on rotor blades. Both of these aircraft enjoy maximum energy availability when the sun is directly overhead, but the energy decreases as a function of the cosine of the angle from the normal to the plane of the solar cells. Operation of such solar powered aircraft is therefore limited by the position of the sun.

One desired capability of a solar powered aircraft is its ability to remain airborne for an indefinite period of time. Another is that it should have unlimited range and not be limited to a single location. Still another is that the craft should be able to position itself so that the solar energy capturing cells are always positioned normal to the rays of the sun.

To accomplish these ends, the craft must be able to recover the maximum possible solar energy throughout the daytime hours. For the craft to have unlimited range, it must be able to convert such stored solar energy to usable form during the nighttime hours. For the solar energy capturing cells to be disposed normal to the sun's rays, the aircraft must be able to tilt or bank as the sun moves relative to the earth's axis.

OBJECTS AND SUMMARY OF THE INVENTION

It is, therefore, a principal object of the present invention to provide a novel high altitude solar powered aircraft which can maintain maximum exposure of its solar energy capturing cells as long as the craft is airborne.

It is another object of the present invention to provide a wing design for a high altitude, solar-powered air craft having wing banking capability to optimize exposure of its solar cells in a direction normal to the rays of the sun.

Still another object of the invention is to provide a solar powered aircraft capable of staying aloft at high altitudes day and night for many months or even years.

These and other objects are achieved by the present invention which is a solar-powered craft having forward and rearward wings, pontoons attached to opposite sides of the main wing, suspension wires attached to the undersides of the pontoons, a gondola suspended from the wires, the gondola including gears or wheels which engage the wires and which are driven in rotation to enable the gondola to ride along the wires from one side of the craft to the other where in so doing, the center of gravity of the craft is shifted and the craft then tilts to effect a banking maneuver.

BRIEF DESCRIPTION OF THE DRAWINGS

FIG. 1 illustrates, in perspective view, the solar powered aircraft of the present invention;

FIG. 2 is a front view of the aircraft shown in FIG. 1 where the craft is flying substantially levelly;

FIG. 3 is a front view of the aircraft shown in FIG. 1 where the craft is making a bank to the left.

FIG. 4 is a front view of the aircraft shown in FIG. 1 where the craft is making a bank to the right.

Similar elements or parts in the various figures of the drawings are designated by the same or similar reference characters.

DETAILED DESCRIPTION OF THE PREFERRED EMBODIMENT

Referring now to the drawing, there is shown an aircraft 100 having an airfoil-shaped wing member 12 supported at opposite ends by inflated pontoons 14 and 16. Each pontoon is inflated with a lighter-than-air gas, preferably helium, and carries a propeller 18, 20 (driven by a motor, not shown; the motor may be located adjacent the propeller) to impart forward motion and lift to the craft.

The preferred propulsion device comprises puller propellers which provide forward motion of the craft. However, the invention also contemplates mounting pusher propellers and motors on the aircraft at an appropriate location, as for example, either on the horizontal wing or toward the rear of the pontoons, in such a manner that forward motion of the craft can be attained.

Vertical stabilizers 22, 24 are mounted at the rear of the pontoons. Horizontal wing 26 extends between and connects the rear ends of the pontoons together. Tail fins 28, 30 extend away from the sides of the pontoons, as shown. A solar cell array 60 covers the main wing upper surface, and is electrically coupled with the gondola 32.

The invention also contemplates a wing 26 which comprises two, separated, opposing wing members similar to members 28 and 30.

In addition to the buoyancy exhibited by the craft by virtue of the inflated pontoons, the combination of the forward wing 12, the rearward wing 26, and the propellers 18,20 enable the craft to experience aerodynamic lift, so that when appropriate conditions demand or suggest the need for lift, the craft can move to a higher altitude.

A gondola 32 is supported beneath the pontoons by suspension wires extending from one pontoon 14 to the other pontoon 16. In the Figures, wire 40 (which is attached to the forward end of pontoon 14) is the same as wire 40' (which is attached to the forward end of pontoon 16); wire 42 (which is attached to the middle of pontoon 14) is the same as wire 42' (which is attached to the middle of pontoon 16); and wire 44 (which is attached to the rearward end of pontoon 14) is the same as wire 44' (which is attached to the rearward end of pontoon 16). Preferably, wires 40, (40'), 42, (42') and 44, (44') are attached to the undersides of pontoons 14 and 16.

Three wires 40 (40'), 42 (42'), and 44 (44') have been shown in the Figures; however, it is to be understood that a greater or lesser number of wires could be used as long as the same function is accomplished.

The gondola 32 contains a set of gears or grooved wheels which are coupled to and suspended from, each of the suspension wires, respectively. Each of the suspension wires passes over the circumference of a respective wheel or gear within the gondola (not shown here; however, the mechanism contemplated is substantially the same as the conventional suspension wire and gear/wheel mechanisms currently being used for aerial tramways). In this way, each respective wire, which is of a fixed length, passes through the body of the gondola and around the wheel or gear, and allows the gondola to move from one side of the craft adjacent one pontoon to the other side of the craft adjacent the other pontoon by travelling along the length of the wires (and under action of a motor housed within the gondola for turning the wheel or gear). In this manner, the gondola is able to effect a lateral shift of the center of gravity of the craft, and thus to impart a banking influence on the craft to enable the craft to make turns, and position the wing in an optimum attitude with respect to the sun.

FIGS. 2–4 show the solar powered aircraft from the front. FIG. 2 illustrates the position of the gondola suspended beneath the pontoons during level flight. FIG. 3 shows the position of the gondola beneath the pontoons when the craft is banking to the left. FIG. 4 shows the position of the gondola beneath the pontoons when the craft is banking to the right.

In FIGS. 3 and 4, it is to be noted that the shifting of the gondola toward one side acts to place a load at that one side of the craft and thus pull that side downwardly relative to the other side. Such shifting of the weight (the gondola) changes the location of the center of gravity of the craft, and thus effects a change in attitude of the craft relative to the horizontal.

Towed behind each pontoon 14 and 16 are a second set of pontoons 114 and 116, for storing gaseous hydrogen and oxygen, respectively. The gases are created by a process of electrolysis which causes dissociation of water, contained in the gondola, during the daylight hours, into hydrogen and oxygen.

At night, the gases are recombined using a hydrogen and oxygen fuel cell located in the gondola for the purpose of generating electricity. Tubes 122 and 124, fluidly coupled with the electrolytic apparatus in the gondola, extend from the gondola to the first set of pontoons and then to the second set of pontoons. The tubes allow the gases generated in the electrolytic apparatus to be stored in the pontoons 114 and 116 until they are recombined by the fuel cell in the gondola.

Gondola 32, in addition to containing gears or wheels to facilitate movement beneath the pontoons from one side thereof to the other, also contains avionic and water storage equipment, power generation and conversion equipment, helium storage, and transmitter equipment. All these items are contained in the gondola which is designed to possess a very low radar signature. The gondola 32 can also include a lower portion or "pod" 120 which is pivotable on an upper portion 122 about a vertical axis. The lower portion may include sensors that can then be swivelled about the vertical axis to permit transmission or reception of information in a variety or angles relative to the front of the craft.

Positioning of the solar cells arranged on the upper side of the main wing normal to the sun azimuth is insured by the banking capability of the craft. The gondola, and thus the center of gravity, is shifted from one side of the craft to the other as needed to achieve banking of the craft and to maintain the optimum positioning of the solar cells relative to the sun.

During the daytime (when the sun is visible to the solar panels), the panels generate electricity to power the avionics, the propeller motors and the gondola shifting mechanism. Excess electricity may be stored in batteries, although the preferred manner of storage is by electrolysis, as described above (i.e., conversion of water to hydrogen and oxygen stored in the towed pontoons which is then recombined to generate electricity when the solar panels are not available for generating electricity.

There has, therefore, been described a novel, high-altitude, solar powered aircraft which includes a wing bearing solar energy capturing cells, buoyancy means for maintaining the aircraft aloft, and means for enabling banking of the aircraft to optimize exposure of the solar cells normal to the rays of the sun. The solar powered aircraft of the invention is capable of staying aloft at high altitudes, day and night, for many months or even years. This capability is valuable for conducting 24 hour surveillance and/or reconnaisance, and to this end, the invention provides a platform to hold aloft for an indefinite period of time, a sensor suite, associated power generating and storage apparatus, and means, if desired, to ensure forward motion to facilitate synthetic aperture radar imaging. The invention is also useful for implementing cellular phone relay stations, for conducting atmospheric sampling and missile range atmosphere condition sampling, and for technical or scientific experiments requiring high altitude long endurance conditions.

The solar-powered craft of the invention includes wings, pontoons attached to opposite sides of the wings, suspension wires attached to the undersides of the pontoons, and a gondola suspended from the wires.

The gondola includes gears or wheels which engage the wires and which are driven in rotation to enable the gondola to ride along the wires from one side of the craft to the other where, in so doing, the center of gravity of the craft is shifted and the craft then tilts to effect a banking maneuver. The craft of the present invention uses a combination of buoyancy and lift, as well as continuous power generation, to achieve operation around the clock— indefinitely.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A solar powered aircraft, comprising:
   (a) airfoil shaped wing means including container means connected thereto for storing a lighter-than-air gas,
   (b) propulsion means, supported by said wing means, for generating lift in combination with said wing means,
   (c) a payload supported beneath said wing means, including means to position solar cells in an optimum solar-radiation-gathering position with respect to the sun, and
   (d) solar energy collecting and converting means carried by said wing means for providing power to said propulsion means.

2. The solar energy powered aircraft of claim 1, wherein said wing means includes a forward wing member carrying said solar energy collecting means.

3. The solar energy powered aircraft of claim 1, wherein said propulsion means is disposed at opposite end regions of said forward wing member.

4. The solar energy powered aircraft of claim 1, and further including suspension means carried by said wing means, said payload comprising means for engaging said suspension means to enable said payload to move between opposite sides of said wing means, whereby shifting of said payload beneath said wing means changes the center of gravity of said craft and enables the craft to bank in the direction of the shift of the payload.

5. The solar energy powered aircraft of claim 4, wherein said suspension means comprises wires spanning and connected to opposite end regions of said wing means, and said payload includes motorized means for moving along said wires.

6. The solar energy powered aircraft of claim 5, wherein said wing means comprises a forward wing and a rearward wing and pontoons interconnecting opposite end regions of said wings, said wires being connected to said pontoons.

7. A solar energy powered aircraft, comprising:
  (a) wing means supporting solar cells,
  (b) suspension means carried beneath said wing means,
  (c) a payload supported on said suspension means, and
  (d) means for coupling said payload to said suspension means including means for shifting the position of said payload between opposite sides of said wing means, whereby shifting of said payload relative to said wing means changes the orientation of the wing means relative to the horizontal and enables the craft to bank in the direction of the shift of the payload.

8. The solar energy powered aircraft of claim 7, wherein said suspension means comprises flexible elongate members and said means for coupling said payload to said suspension means comprises means for engaging said suspension means and pulling said payload along said suspension means from one side region of said wing means to another side region.

9. The solar energy powered aircraft of claim 8, wherein said payload includes a water supply and electrolysis apparatus, and further including container means towed behind said wing means for storing gaseous by-products of electrolysis, and means for fluidly coupling said container means with said electrolysis apparatus.

10. A solar energy powered aircraft, comprising:
  (a) balloon means including support means and solar energy collecting apparatus carried on said support means,
  (b) suspension means carried beneath said balloon means,
  (c) a payload supported on said suspension means, said payload including a supply of water and electrolysis apparatus,
  (d) container means towed behind said balloon means for storing the gaseous by-products of electrolysis, and
  (e) means for fluidly coupling the electrolysis apparatus in said payload with said container means.

11. The aircraft of claim 10, and further comprising means for shifting the position of said payload beneath said balloon to effect banking of the aircraft, whereby the wing may be positioned in an optimum attitude with respect to the sun.

* * * * *